Figures 1, 2:
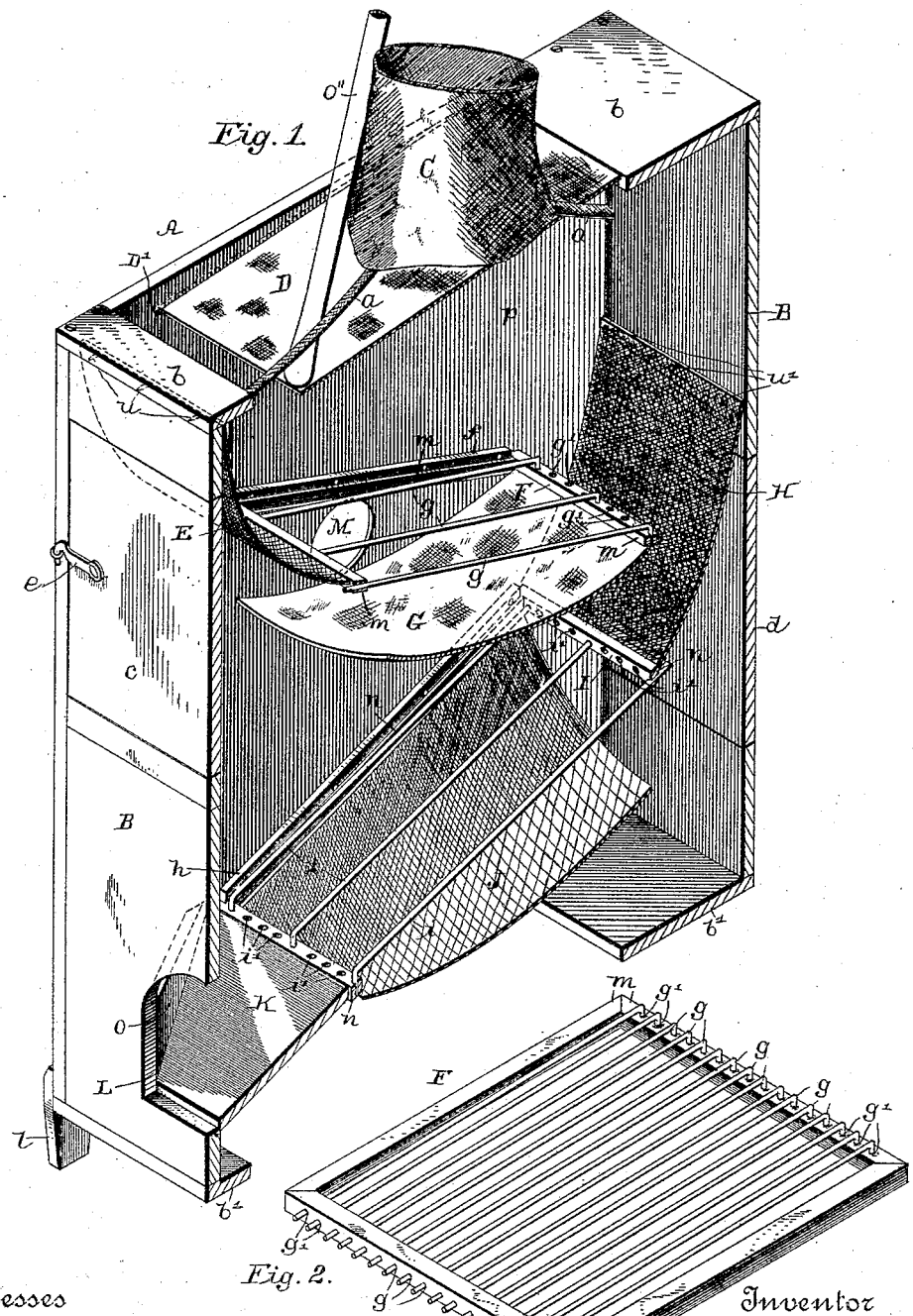

(No Model.) 2 Sheets—Sheet 1.
J. W. HOWELL.
FRUIT GATHERER.

No. 444,884. Patented Jan. 20, 1891.

Witnesses
F. G. Fischer
M. A. Balderson

Inventor
J. W. Howell
By his Attorneys
Higdon & Higdon

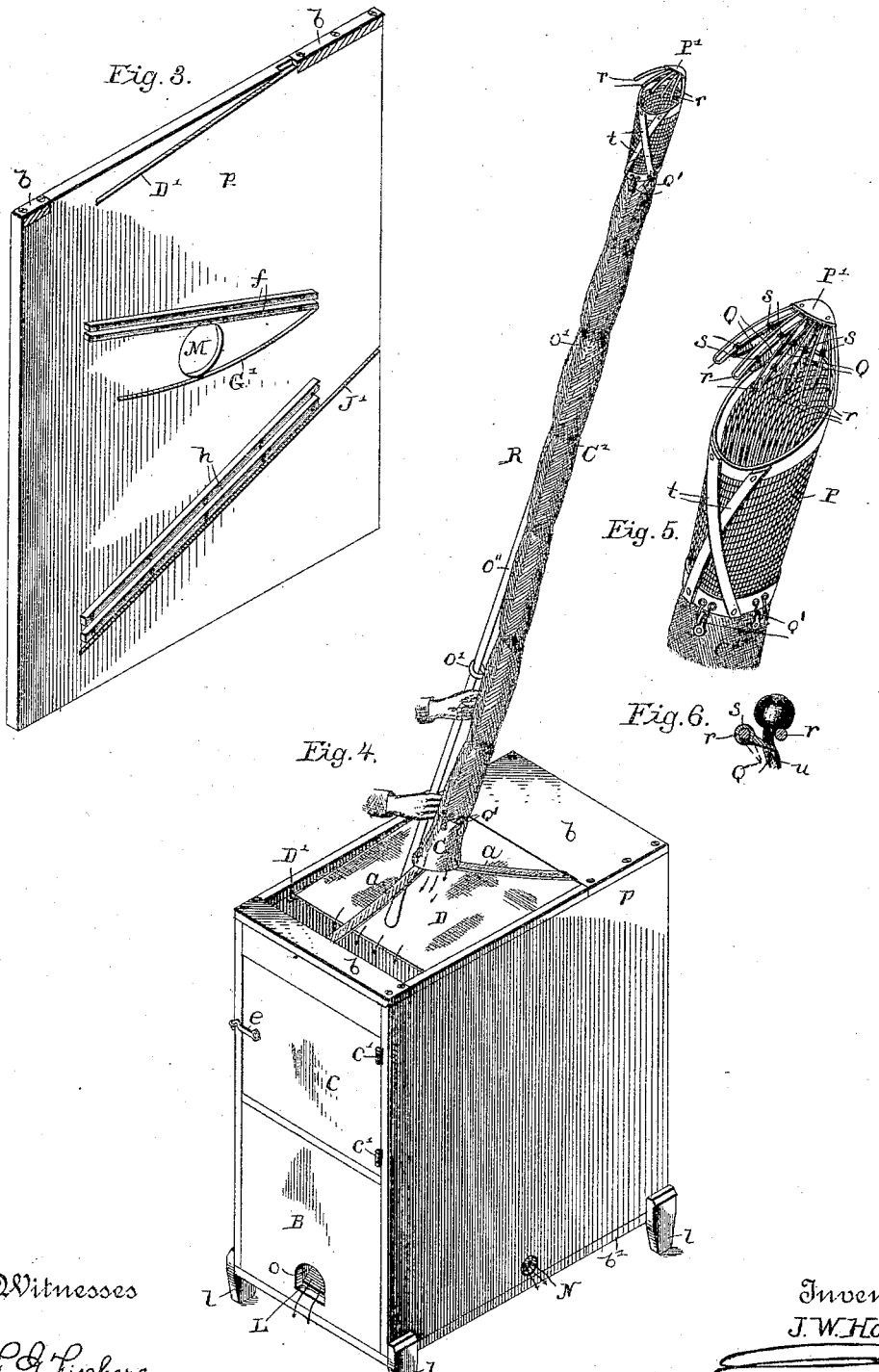

UNITED STATES PATENT OFFICE.

JOHN W. HOWELL, OF MONTANA, KANSAS.

FRUIT-GATHERER.

SPECIFICATION forming part of Letters Patent No. 444,884, dated January 20, 1891.

Application filed August 16, 1889. Serial No. 320,984. (No model.)

*To all whom it may concern:*

Be it known that I, JOHN W. HOWELL, of Montana, Labette county, Kansas, have invented certain new and useful Improvements in Combined Fruit Gatherers and Separators, of which the following is a full, clear, and exact description, reference being had to the accompanying drawings, forming a part hereof.

My invention relates to improvements in combined fruit gatherers and graders; and it consists in the arrangement and novel construction of the different parts, hereinafter set forth and described.

The object of my invention is to provide an apparatus by means of which all kinds of fruit from the smallest to the largest size may be gathered.

In the drawings, which illustrate the manner of carrying out my invention, Figure 1 is a vertical section in perspective, showing the arrangement of the interior of the grading-box. Fig. 2 is a detail in perspective of one of the sieves or graders, the same carrying a full set of rods for the purpose of separating the smaller fruits, such as cherries, plums, &c. Fig. 3 is a detail in perspective of one of the sides of the grading-boxes, showing the skids and grooves which carry the separators and canvas troughs. Fig. 4 is a perspective view of my combined gatherer and grader, showing the same in position for operation. Fig. 5 is a detail in perspective, showing the metallic scoop-shaped head of the gatherer, and Fig. 6 is a sectional view showing the manner in which the knives secured to the gathering wires or fingers operate.

Referring to the drawings by letter, A represents my invention, which consists of a grading-box B and gatherer R. Said gatherer is composed of flexible material C and C', the former of which is secured to upper end of the grading-box by means of straps $a$. As it may be necessary to gather fruit from the highest branches of the tree, I make the flexible body in sections C', which are secured by means of hooks and eyes Q'. The upper scoop-shaped end of the gatherer, which is supported by means of handle O'', consists of forked wires $r$, which carry knives Q, which are loosely swung on the wires by hinges $s$, so that when the forked ends are placed around the stem of the fruit and the gatherer moved in such a manner that the pendent knives will swing against the stem, and being caught therein, will have the position shown in Fig. 6. As the forked wires are nearer together toward their rear ends, where they are held by the clamp P', it will be seen that by moving the gatherer forward the knives Q will slide in the stem, which is held by a wire $r$, and as the distance between the rear end of the knife and the wire is less than the distance between their forward ends the stem of the fruit will be severed. As is shown in Fig. 2, the rear of the knife may be farther from its pivoting-wire $r$ than its forward end for the purpose of facilitating the cutting of the stems, and the length of the forked wire is such that the fruit which has been severed, rolling thereoff, will fall into the gatherer-head P. This head is composed of wire-gauze braced by metallic straps $t$. In order that the handle and flexible body of the gatherer will always retain nearly a parallel position with one another, I pass said handle through loops $o'$, which are attached to said flexible body. After the stems of the fruit have been clipped the fruit passes down through the flexible body of the gatherer and falls upon canvas shelf or trough D, which is supported in grooves D', cut in sides $p$ of the grading-box. The fruit passes from said shelf onto canvas E, which is secured to the end of the grading-box by nails $u$. The fruit is conducted therefrom onto inclined sieve or grader F, which is provided with rods $g$. Said sieve or grader is held in position by means of skids $f$, from whence the grader can be removed through door $c$ when so desired. As the fruit passes from canvas E onto grader F, all the smaller fruit falls between rods $g$ onto canvas shelf G, which conducts it to perforation M in the side of the grader, from whence it is discharged onto the ground or into a receptacle that may be placed there to receive it. The larger fruit passes over rods $g$ onto canvas H, (which is secured to the end of the grading-box by means of nails $u'$,) thence to sieve or grader I, which is held in position in the same manner as grader F. Rods $i$ are wider apart than those in grader F, so that the fruit which is a size or two larger is discharged through perforation N, and all fruit which is too large to pass between rods *i* is discharged through opening L, located in the lower end of the box, and thus it will be seen that with the aid of two sieves or separators the fruit is divided into three classes. When it is desired to separate the smaller classes of fruit, separators F and I are removed through doors *c* and B, and a series of perforations *g'* are provided with rods. Said perforations may be made so close to one another that the very smallest class of fruits or berries may be graded, and when the larger class of fruit is to be graded any number of rods may be removed from the frames. The shelves D, G, and J may be constructed of canvas or any other flexible material, in order that they may be so bent as to insure the safe conduction of the fruit through the grading-box, and it will also be noticed that they are supported by grooves cut in the sides of the grading-box, so that they can readily be removed, if necessary. Supports or legs *l* of the grading-box may be lengthened, so that the baskets may be placed under the two lower outlets L N for the reception of the fruit. As will be noticed, the separators are placed on a comparatively slight incline, so that the fruit will not pass over them at a very high rate of speed in connection with canvas stops E and H, which retard the motion of the fruit as it falls from shelf D and separator F, preventing the fruit from becoming bruised in any manner while passing through the grading-box. The wire-gauze head permits the operator to more clearly see the fruit to be gathered than were it made solid.

Having thus described my invention, what I claim, and desire to secure by Letters Patent, is—

1. In a fruit-gatherer, the combination, with a flexible tubular body, of forked wires above the top thereof and knives pivoted to the said wires, as described.

2. In a fruit-gatherer, the combination, with converging forked wires, of pendent pivoted knives mounted thereon, as described.

3. In a fruit-gatherer, the combination, with converging forked wires, of knives pivoted thereon and depending therefrom, the said knives having their opposite ends at different distances from the said wires, as described.

4. In a fruit-gatherer, the combination of a flexible conveyer, a scoop-shaped head constructed of wire-gauze on the top thereof, forked converging wires above the said head, and pendent knives pivoted to the said wires, as described.

In testimony whereof I affix my signature in presence of two witnesses.

JOHN W. HOWELL.

Witnesses:
 W. H. PORTER,
 G. W. HENDRICKS.